Figure 1:
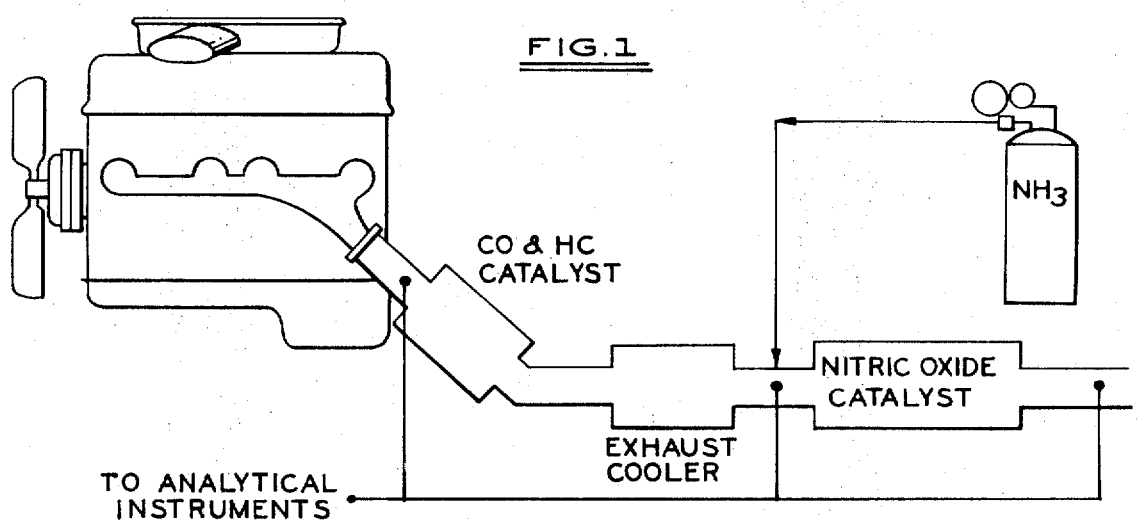

United States Patent

[11] 3,599,427

[72] Inventors: James H. Jones, Dearborn;
Ervin E. Weaver, Livonia, both of, Mich.
[21] Appl. No. 859,765
[22] Filed Sept. 22, 1969
[45] Patented Aug. 17, 1971
[73] Assignee Ford Motor Company, Dearborn, Mich.

[54] EXHAUST GAS PURIFICATION
4 Claims, 4 Drawing Figs.
[52] U.S. Cl. .................................................. 60/30, 23/2 E, 23/288 F
[51] Int. Cl. .................................................. F01n 3/14, F01n 3/16
[50] Field of Search .................................... 60/30; 23/2 E, 288 F, 2 S

[56] References Cited
UNITED STATES PATENTS

| | | | |
|---|---|---|---|
| 1,891,170 | 12/1932 | Nose | 60/30 |
| 3,142,150 | 7/1964 | Pearlman | 60/30 |
| 3,228,746 | 1/1966 | Howk | 60/30 |
| 3,279,884 | 10/1966 | Nonnenmacher | 23/2 S |
| 3,449,063 | 6/1969 | Griffing | 23/2 E |

Primary Examiner—Douglas Hart
Attorneys—John R. Faulkner and Thomas H. Oster

ABSTRACT: This invention is concerned with a process for the effective removal of carbon monoxide hydrocarbons and the oxides of nitrogen from the exhaust stream of mobile internal combustion engines. This purification is accomplished by passing the exhaust gas from an engine operating at near the stoichiometric fuel-air ratio through a high-temperature catalyst. This catalyst is normally a noble metal catalyst. The exhaust gas is then cooled to a temperature in the vicinity of 700° F., ammonia is added and the ammoniated stream is passed over a second catalyst which can be either a base metal catalyst or a noble metal catalyst.

PATENTED AUG 17 1971  3,599,427

SHEET 1 OF 3

INVENTORS
JAMES H. JONES
ERVIN E. WEAVER
BY John R. Faulkner
Thomas H. Oster
ATTORNEYS

EXHAUST GAS PURIFICATION

The recent severe political and popular pressure to reduce or eliminate air pollution by automotive vehicles has resulted in intense efforts to modify the internal combustion engine and its accessory equipment to retain the unquestioned advantages of the internal combustion engine and at least to palliate its allegedly adverse effects upon the ambient in which all of us are obliged to exist.

This invention is presented as an improvement upon that defined and claimed in U.S. Pat. No. 3,449,063 issued June 10, 1969 to Griffing et al. This patent is made a portion of this record and is incorporated as a portion of this document in toto by reference. The purposes of the Griffing et al. patent are succinctly set forth in lines 20 to 26 of column 1 as follows:

"This invention relates to a method of reducing the unburned hydrocarbon, carbon monoxide and oxides of nitrogen content of the exhaust gas of internal combustion engines. In particular, this invention relates to a method of reducing the noxious components of exhaust gas by contacting the exhaust gas together with oxygen, ammonia and a copper-containing catalyst."

This invention also relies upon the ability of ammonia to destroy oxides of nitrogen in exhaust gas in the presence of oxygen in limited amounts by passing an ammoniated exhaust stream over a catalyst at comparatively low temperatures.

This invention differs from that of Griffings et al. in that the catalytic beneficiation of the exhaust stream is accomplished in two distinct steps, one operating a high temperature and the second at a lower and controlled temperature. The initial purification step is carried out directly upon the very hot exhaust gas as it leaves the engine and is intended to reduce the carbon monoxide and hydrocarbon content of the exhaust stream. No ammonia is added at this step. The somewhat purified exhaust stream emerging from the initial step is cooled and treated with a small addition of ammonia. This cooled and ammoniated exhaust stream is then passed over a second catalyst bed to produce a very acceptable effluent.

Figure 3:
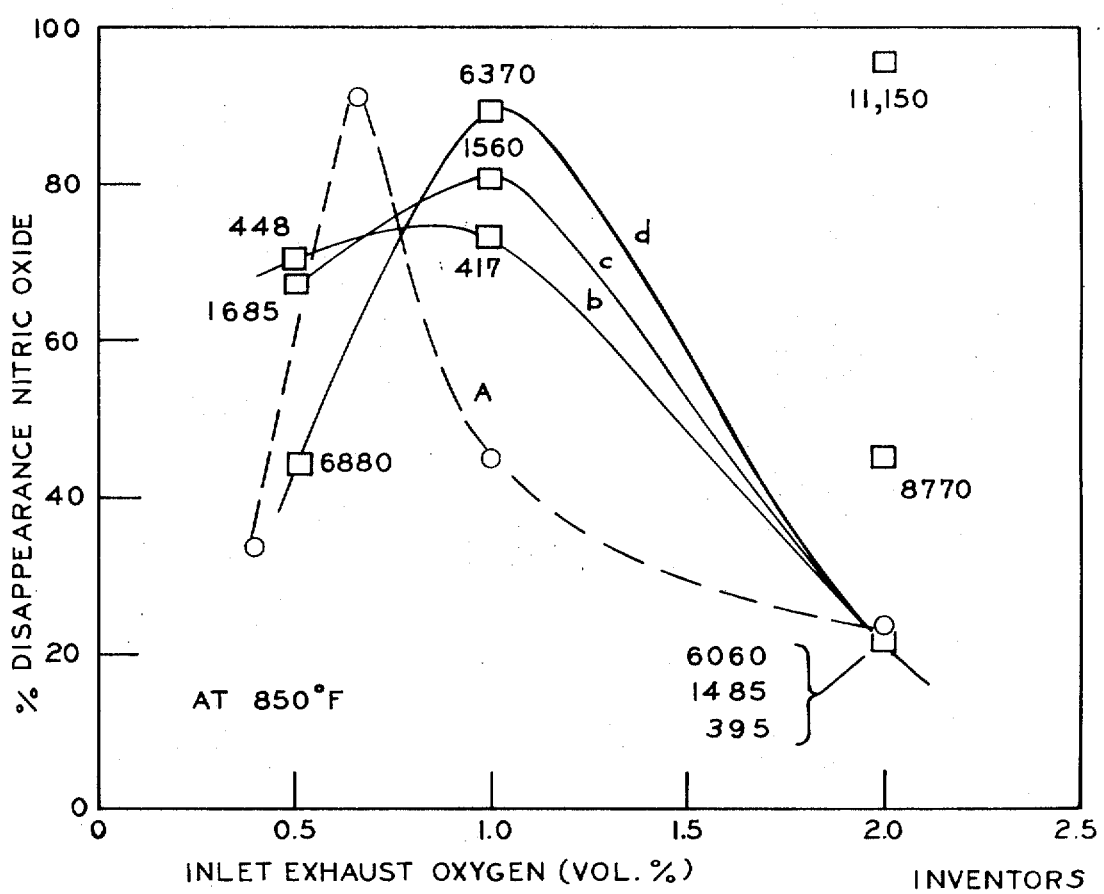
Figure 2:
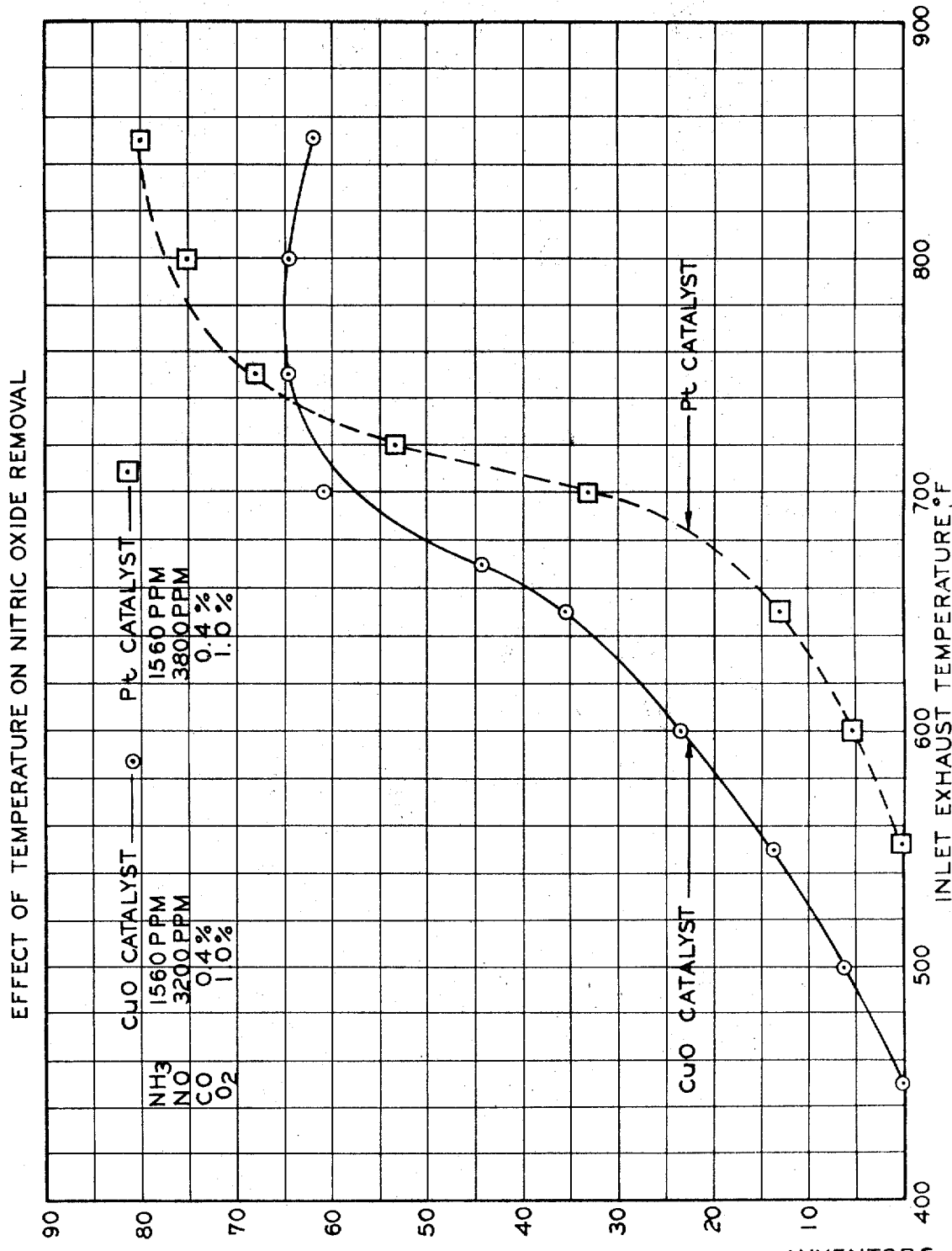
Figure 4:
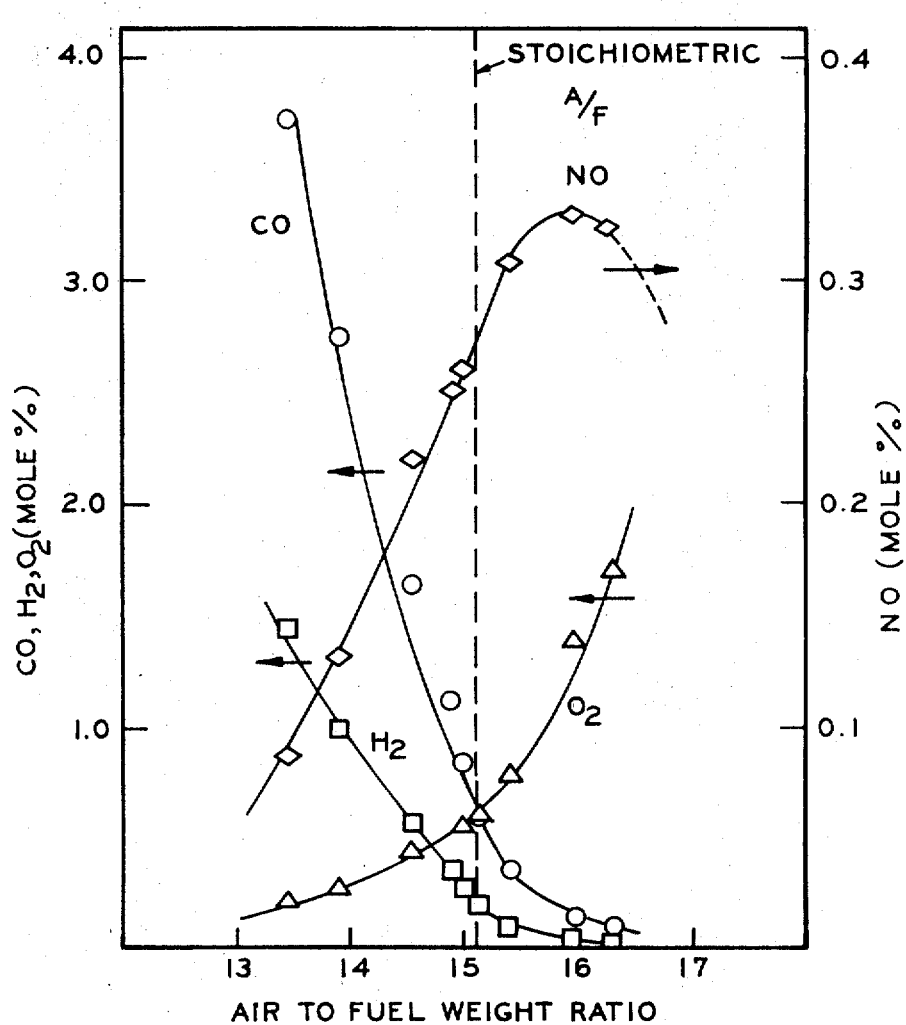

To facilitate a comprehension of this invention the following drawings have been prepared in which FIG. 1 is a schematic drawing of the apparatus employed in the execution of this invention, and FIG. 2 is a graphical showing of the effect of temperature upon oxide of nitrogen destruction, and FIG. 3 is a graphical showing of the efficiency of oxides of nitrogen removal at various levels of ammonia operating at 850° F., and FIG. 4 is a graphical showing of the chemical constituents of a normally cruising vehicle engine as a function of the air to fuel weight ratio.

FIG. 1 depicts schematically a system which has been employed for the reduction of carbon monoxide, hydrocarbons and oxides of nitrogen originating in one bank of cylinders of a conventional V-8 vehicular engine. Attention is invited to the fact that the hot exhaust stream is led directly to a first catalyst for the removal of carbon monoxide and hydrocarbons. This catalyst operates upon the untreated exhaust stream and is capable of operating over a very wide range of temperatures, and is in fact limited only in that the stream must be heated sufficiently to be operative and that sufficient oxygen be available. It is capable of operating at any elevated temperature encountered in engine exhaust. The exhaust stream from this first catalyst is passed through a cooler and then through the second or nitric oxide removal catalyst. This catalyst is temperature limited and hence the cooling step.

FIG. 2 has been presented to demonstrate the reason for the cooling of the exhaust stream before treatment with the nitric oxide destruction catalyst. Temperatures not substantially above 900° F. should be employed in this catalyst since such temperature insures maximum nitric oxide conversion and avoids the catalyst degradation implicit in operation at higher temperatures.

FIG. 3 is a graphical showing of the catalytic destruction of nitric oxide employing ammonia additions as indicated in the numerals in the body of the graph. This Figure presents four separate curves which have been designated $a$, $b$, $c$ and $d$. Curve $a$ depicts the conditions obtaining with the addition of no ammonia. Curves $b$, $c$ and $d$ represent progressively larger additions of ammonia. Attention is invited to the fact that a highly satisfactory elimination of nitric oxide is possible with no ammonia addition, but over a very narrow range of oxygen content in the exhaust stream. It has been impossible to date to control the oxygen content of commercial engines to this degree of exactitude. The addition of small amounts of ammonia as shown by curves $b$, $c$ and $d$ greatly broadens the permissible range of oxygen contents of the exhaust stream which are consonant with satisfactory catalytic reduction of nitric oxide to nitrogen.

FIG. 4 has been presented to demonstrate the exhaust chemistry of a normally operating vehicular engine and demonstrates the sensitivity of the exhaust composition to the air fuel ratio, particularly as this ratio departs in either direction from stoichiometric. A consideration of this Figure and FIG. 3 demonstrates the utility of any invention which will permit the catalytic reduction of nitric oxide under a wide spread of oxygen contents.

The copper oxide type of catalysts employable in this invention are well known and understood in the art and are furthermore very explicitly described in the Griffings et al. patent. To this showing it is desired to add the following specific copper oxide catalyst preparation procedure which has been found to produce a very effective product.

A copper oxide catalyst is prepared by impregnating a support material with cupric nitrate solution. A solution containing 260 gm. of cupric nitrate, trihydrate dissolved in 2 liters of water is prepared. Following this, 1.5 liters of an activated alumina support containing 5 percent silica is immersed in the solution for 2½ hours. After decantation, the impregnated support is dried at 100° C. over night and then is placed in a calcining oven at 565° C. for 1½ hours. After a second half hour soak in the cupric nitrate solution followed by drying at 100° C. over night, the catalyst is calcined for 3 hours at 590° C. in a stream of flowing air.

The catalyst prepared in this manner contains about 5 percent copper in the form of copper oxide on the support.

The noble metal catalysts required for this invention in certain of its aspects are also well known to those skilled in the art. A particularly effective preparation is described in example X of British Pat. 693,648 which for convenience is reproduced below.

"A catalyst similar to that prepared in example IX but having a low density (0.45) was prepared in substantially the same manner as described in example IX except as regards the ageing of the alumina-halogen spheres. The spheres in this example were aged in 1 liter of hot "Nujol" at a temperature of 93°—99° C. for about 21 hours, the "Nujol" was decanted from the spheres, and the spheres were then aged in 1 liter of hot ammonium hydroxide solution (5 parts water and 1 part concentrated ammonium hydroxide) at 93°—99° C. for about 24 hours. The spheres were then washed, dried, calcined and composited* with platinum in substantially the same manner as described in example IX. The catalyst as prepared in this manner had a density of 0.45 (gm. per cc.) and contained 0.3 percent platinum, 0.33 percent combined fluorine and 0.36 percent chlorine by weight. *("composited") as defined in example IX.

The calcined spheres were soaked in an aqueous solution of chloroplatinic acid in an amount to form a final catalyst containing 0.3 percent by weight of platinum. The solution was evaporated to dryness and the spheres were then dried at a temperature of 99° C. for 1 hour and finally calcined at a temperature gradually increasing to 500° C. for a period of 3 hours and then held at this temperature for 3 hours.

Ammonia is most conveniently and inexpensively obtained by the gasification of pressurized anhydrous liquid ammonia, but the invention is by no means so limited. Any compound which readily releases ammonia, or functions as its chemical equivalent may be substituted for ammonia. Ammonium hydroxide, ammonium carbonate, urea, hexamethylene tetramine, hydrazine and ethylene diamine are among compounds which have been successfully substituted for ammonia gas in this process.

Two catalysts were installed in series in the exhaust system from one side of a V-8 engine as shown in FIG. 1. A water cooler was used to cool the exhaust before the second catalyst. The first catalyst, mainly for CO and hydrocarbon control, was the catalyst described in British Pat. 693,648. The second catalyst for NO control was the platinum catalyst described in that patent. The engine was operated on isooctane fuel (A/F=14.8 at 2,000 r.p.m. and 15.5 in. Hg. absolute. Results obtained at an exhaust temperature of 600° F. before the second catalyst and on the addition of 0.05 cfm. gaseous ammonia to the exhaust at this point are as follows:

|  | NO, p.p.m. | CO, mole percent | HC, p.p.m. | $O_2$, mole percent | $CO_2$, mole percent |
| --- | --- | --- | --- | --- | --- |
| Before 1st catalyst | 1,508 | 1.55 | 335 | 0.85 | 12.60 |
| Before 2nd catalyst | 665 | 0.52 | 65 | 0.20 | 13.43 |
| After 2nd catalyst | 295 | 0.29 | 45 | 0.05 | 13.60 |

The first catalyst volume was 80 in.$^3$ and the second was 235 in.$^3$

The first catalyst primarily removes the CO and hydrocarbons (HC) from the exhaust but it also is effective in removing some NO.

The second catalyst is effective in NO removal after the exhaust is cooled and ammonia added even in the presence of oxygen. Additional removal of hydrocarbon and CO is also observed.

The copper oxide catalyst described above was tested under conditions just described, with the exception that the exhaust gas temperature before the second catalyst was 715° F. and the A/F ratio was 15.1. The results are as follows:

|  | NO, p.p.m. | CO, Mole percent | HC, p.p.m. | $O_2$, mole percent | $CO_2$ mole, percent |
| --- | --- | --- | --- | --- | --- |
| Before 1st catalyst | 1,543 | 1.10 | 255 | 0.85 | 12.60 |
| Before 2nd catalyst | 590 | 0.52 | 45 | 0.20 | 13.09 |
| After 2nd catalyst | 95 | 0.25 | 35 | 0 | 13.25 |

The following data illustrate the selectivity of the ammonia in removing NO even in the presence of 1 and 2 percent oxygen. Inlet exhaust temperature was between 750° and 850° F.

| a | b | c | d | e | f |
| --- | --- | --- | --- | --- | --- |
| $NH_3$ added (p.p.m.) | Inlet $O_2$ (mole percent) | NO removed (p.p.m.) | NO remaining (p.p.m.) | $O_2$ removed (p.p.m.) | $O_2$ remaining (p.p.m.) |
| 11,150 | 2 | 2,800 | 300 | 11,500 | 6,000 |
| 6,370 | 1 | 1,760 | 320 | 3,500 | 3,500 |
| 417 | 1 | 1,080 | 1,000 | 2,500 | 4,500 |

In these examples, the column $d$ and $f$ show the concentrations of NO and $O_2$ remaining in the exhaust; in each case the concentration of $O_2$ is considerably greater than the level of NO at the exit of the converter. The excellent selectively of $NH_3$ as a reducing agent is illustrated on the last line of the table where 417 p.p.m. $NH_3$ removed 1,080 p.p.m. NO in the presence of excess $O_2$ in the exhaust. The amount of $O_2$ removed (column $e$) is considerably higher than the NO removed (column $c$) in each case. This is because CO, $H_2$ and hydrocarbons also react with $O_2$ along with $NH_3$ to reduce the concentration of $O_2$.

A catalyst converter containing 400 in.$^3$ of platinum catalyst was installed in the exhaust system 12 inches from the exhaust manifold flange on one side of a V-8 engine in a vehicle. The vehicle was operated at a Cruise 50 condition on a chassis dynamometer with nonleaded fuel. The following data were obtained at an A/F ratio of 14.7, exhaust gas temperature of 1,180° F., with 0.1 cfm. of ammonia added to the exhaust prior to the catalyst:

|  | NO, p.p.m. | CO, mole percent | HC, p.p.m. hexane | $O_2$, mole percent | $CO_2$, mole percent |
| --- | --- | --- | --- | --- | --- |
| Before catalyst | 3,360 | 0.29 | 150 | 0.5 | 14.51 |
| After catalyst | 4,000 | 0.07 | 10 |  |  |

The same 400 in.$^3$ converter was then located 5 feet further downstream in the exhaust pipe after a catalyst converter containing 117 in.$^3$ of a platinum catalyst. The arrangement was similar to that shown in FIG. 1 except that water cooling was not used.

The following data were obtained at an A/F ratio of 14.9, exhaust temperature of 1,100° F. at the inlet to the 400 in.$^3$ converter, with 0.1 cfm. of ammonia again added to the exhaust prior to the second catalyst.

|  | NO, p.p.m. | CO, mole percent | HC, p.p.m. hexane | $O_2$ calculated mole percent | $CO_2$, mole percent |
| --- | --- | --- | --- | --- | --- |
| Before 1st catalyst, 117 8n.$^3$ | 3,265 | 0.22 | 137 | 1.06 | 14.25 |
| Before 2nd catalyst, 400 in.$^3$ | 2,945 | 0.07 | 10 | 0.84 | 14.89 |
| After 2nd catalyst | 60 | 0.07 | 10 |  | 14.57 |

The data demonstrated the advantage of two catalysts in series for the control of NO, CO and hydrocarbons. The 400 in.$^3$ converter is much more effective in NO removal when preceded by the first catalyst due to lower temperatures, lower CO concentration, or higher oxygen level or a combination of these factors.

We claim:

1. The process of producing an internal combustion exhaust effluent containing greatly reduced percentages of carbon monoxide, unburned hydrocarbons and oxides of nitrogen comprising operating the internal combustion engine with the air to fuel weight ratio adjusted to a value not substantially lower than the stoichiometric value whereby unacceptably high concentration of oxides of nitrogen are produced in the exhaust stream, passing the exhaust stream directly from the engine to a first catalyst for the destruction at high temperature of a substantial fraction of the carbon monoxide and unburned hydrocarbons, cooling the exhaust stream which has been impoverished with respect to carbon monoxide and unburned hydrocarbons to a temperature not substantially in excess of 900° F.; adding ammonia to the cooled stream in an amount to destroy a substantial portion of the oxides of nitrogen despite the presence of oxygen, and passing this cooled and ammoniated exhaust stream over a second capable of causing the ammonia and oxides of nitrogen to react to produce unobjectionable nitrogen and water.

2. The process recited in claim 1 in which the ammonia is at least partially replaced by a compound selected from the group consisting of ammonium hydroxide, ammonium carbonate, urea, hexamethylene tetramine, hydrazine and ethylene diamine.

3. The process recited in claim 1 in which the catalysts are based upon either copper oxide or the noble metals.

4. The process recited in claim 1 in which the first mentioned catalyst is based upon a noble metal and the second named catalyst upon copper oxide.